(12) United States Patent
Kanie et al.

(10) Patent No.: US 6,805,524 B2
(45) Date of Patent: Oct. 19, 2004

(54) SCREW GROMMET

(75) Inventors: Hideki Kanie, Toyohashi (JP); Masashi Dendo, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/194,511

(22) Filed: Jul. 12, 2002

(65) Prior Publication Data

US 2003/0143054 A1 Jul. 31, 2003

(30) Foreign Application Priority Data

Jan. 31, 2002 (JP) ........................................ 2002-023735

(51) Int. Cl.[7] .............................................. F16B 37/04
(52) U.S. Cl. ........................... 411/174; 411/22; 411/55; 411/182
(58) Field of Search ................................ 411/174, 175, 411/182, 508–510, 913, 55, 59, 21, 22; 24/297, 453

(56) References Cited

U.S. PATENT DOCUMENTS

| 895,769 A | * | 8/1908 | Kohnstamm ................. 411/71 |
| 4,284,378 A | * | 8/1981 | Mizusawa ..................... 411/21 |
| 4,610,587 A | * | 9/1986 | Wollar et al. ............... 411/80.1 |
| 4,614,471 A | * | 9/1986 | Mauritz ........................ 411/21 |
| 4,677,714 A | * | 7/1987 | Wright ........................ 411/554 |
| 4,878,791 A | * | 11/1989 | Kurihara et al. .............. 411/55 |
| 5,106,225 A | * | 4/1992 | Andre et al. ............. 403/408.1 |
| 5,540,528 A | * | 7/1996 | Schmidt et al. ................ 411/55 |
| 5,746,559 A | * | 5/1998 | Shirai ......................... 411/182 |
| 5,961,264 A | * | 10/1999 | Postadan .................... 411/174 |
| 6,533,487 B2 | * | 3/2003 | Clark .......................... 403/71 |

* cited by examiner

*Primary Examiner*—Flemming Saether
*Assistant Examiner*—Jori Schiffman
(74) *Attorney, Agent, or Firm*—Harness, Dickey & Pierce, P.L.C.

(57) ABSTRACT

The screw grommet 1 comprises a flange 2 and a shank 3 extending from the flange. The shank is provided with flexible legs 7 extending from the end of the shank towards the flange and outwardly from the shank. The shank has a screw insertion hole 13 into which a tapping screw is screwed to prevent the legs from being bent radially inward towards the shank so that the screw grommet is fixed to the workpiece by means of the legs and the flange. The inner portion of the legs is provided with a threaded section turned by screwing in the tapping screw. The flange 2 is integrated with a tubular fastening torque bearing section 18 extending in the direction opposite the shank 3. The fastening torque bearing section is formed with a screw insertion hole having a diameter smaller than the outside diameter of the tapping screw so as to receive the tapping screw.

8 Claims, 7 Drawing Sheets

SCREW GROMMET

FIELD OF THE INVENTION

The present invention relates to a plastic screw grommet for connecting and securing an attached component such as a cover to a workpiece such as a car body by screwing in a tapping screw and, more specifically, to a screw grommet that maintains a high level of attachment force while reducing the fastening torque load on the legs of the shank when the tapping screw is screwed in.

BACKGROUND OF THE INVENTION

A screw grommet, in which the grommet is equipped with a flange and a shank extending from the flange, in which the shank is hollow and inserted into an attachment hole in a workpiece, in which the shank has flexible legs extending towards the flange from the end of the shank and extending radially outward from the shank with the end towards the flange being the free end, in which a threaded through-hole is formed in the flange and shank for receiving a tapping screw, and in which screwing the tapping screw into the threaded through-hole prevents warping of the free end of the legs towards the inside radially are well known in the art. Specific examples are disclosed in Japanese Unexamined Patent Application Disclosure [Kokai] No. 55-14359, Japanese Unexamined Utility Model Application Disclosure No. 62-200807, Registered Design No. 704108 (disclosed in 1987), and Kokai No. 5-187422. The screw grommets disclosed in these publications all have threaded sections in the ends of the shank legs for receiving a tapping screw and sections near the workpiece adjacent to the flange for avoiding the tapping screw. For this reason, the force applied by the legs to the work-piece is somewhat weak. A screw grommet was disclosed in Kokai No. 1-216109 that does not rotate with the tapping screw even when applied to a round attachment hole. In this screw grommet, the central section of the legs in the shank expand outward.

The legs expand outward strongly when the tapping screw is screwed into the free end of the legs to secure the screw grommet to the workpiece and keep it from rotating with the tapping screw.

Because the screw grommet disclosed in Kokai No. 1-216109 is attached strongly to the workpiece, it is ideal. However, when the tapping screw is screwed into the legs and strong fastening torque from the tapping screw is applied to the free end of the legs, strong moment is applied to the base of the legs (end of the shank), and the legs are twisted and damaged. Because the latest fastening tools are strong and compact, the tapping screw applies strong torque, and the probability of damage to the legs is great.

The purpose of the present invention is to provide a screw grommet in which the legs of the shank expand outward strongly to secure the grommet to the workpiece while preventing damage to the legs due to fastening torque from the tapping screw.

Another purpose of the present invention is to provide a screw grommet in which the legs of the shank expand outward strongly to bring the legs into contact with the workpiece and secure the workpiece even more firmly.

SUMMARY OF THE INVENTION

The purposes of the present invention are achieved by providing a screw grommet wherein the grommet is equipped with a flange and a shank extending from the flange, wherein the shank is hollow and inserted into an attachment hole in a workpiece, wherein the shank has flexible legs extending towards the flange from the end of the shank and extending radially outward from the shank with the end towards the flange being the free end, wherein a threaded through-hole is formed in the flange and shank for receiving a tapping screw, wherein screwing the tapping screw into the threaded through-hole prevents warping of the free end of the legs towards the inside radially, wherein the flange and the legs securely in contact with the edge of the attachment hole in the workpiece fix the grommet to the workpiece, wherein a threaded section is formed on the inside section of the free end of the legs for receiving the tapping screw and extending towards the inside so the diameter of the threaded through-hole becomes smaller than the outer diameter of the tapping screw, wherein a tube-shaped fastening torque bearing section extending opposite the shank is integrated with the flange, wherein a threaded through-hole is formed in the fastening torque bearing section with a diameter smaller than the outside diameter of the tapping screw for receiving the tapping screw, and wherein the fastening torque from screwing in the tapping screw is born by the fastening torque bearing section outside the threaded section of the legs.

Because the screw grommet has a threaded section on the inside of the free ends of the legs with a diameter greater than the outer diameter of the tapping screw, the free ends of the legs expand outward strongly and the screw grommet is secured to the workpiece firmly. Because a threaded through-hole with a diameter smaller than the tapping screw is formed in the fastening torque bearing section and the fastening torque from screwing in the tapping screw is born by the fastening torque bearing section outside the threaded section of the legs, strong fastening torque is not concentrated in the legs and the legs are less likely to be damaged. As a result, a fastening tool with high fastening torque can be used and the screw grommet can be used to quickly attach a component.

Ideally, the screw grommet should be designed so the legs are formed as pairs of anchor-shaped legs opposed to each other diametrically, the ends of the legs are connected to the main section of the shank and the legs are separated from the main section of the shank by a U-shaped groove, and ribs are formed extending axially towards the threaded through-hole on the inside of the main section of the shank separate from the legs for bearing some of the fastening torque when the tapping screw is screwed in. As a result, high fastening torque can be dispersed. The circumferential width of the shank in the U-shaped groove becomes smaller, and the twisting of the legs due to fastening torque when the tapping screw is screwed in can be prevented by contact with the main body of the shank. A locking shoulder is formed in the anchor-shaped legs to engage the edge of the hole in the workpiece, and the locking shoulder is not parallel but at a constant angle to the engaged surface of the workpiece. As a result, the workpieces of varying thicknesses can be secured firmly. Ideally, a holding clip with a U-shaped curve substantially parallel to the flange surface is integrated into the end of the fastening torque bearing section. This holding clip can be used to connect different components.

The present invention is also a screw grommet, in which the grommet is equipped with a flange and a shank extending from the flange, in which the shank is hollow and inserted into an attachment hole in a workpiece, in which the shank has flexible legs extending towards the flange from the end of the shank and extending radially outward from the shank with the end towards the flange being the free end, in which a threaded through-hole is formed in the flange and shank for receiving a tapping screw, in which screwing the tapping screw into the threaded through-hole prevents warping of the free end of the legs towards the inside radially, in which the flange and the legs securely in contact with the edge of the attachment hole in the workpiece fix the grommet to the workpiece, in which a threaded section is formed on the inside section of the free end of the legs for receiving the tapping screw and extending towards the inside so the diameter of the threaded through-hole becomes smaller than the outer diameter of the tapping screw, and in which the sections of the legs other than the threaded section are thin and extendable so as to draw the free end closer to the flange when the tapping screw is screwed in and fastened. As a result, the legs are raised towards the surface of the workpiece and more firmly secured.

DETAILED DESCRIPTION OF THE PREFERRED EMBODIMENT

Figure 1:
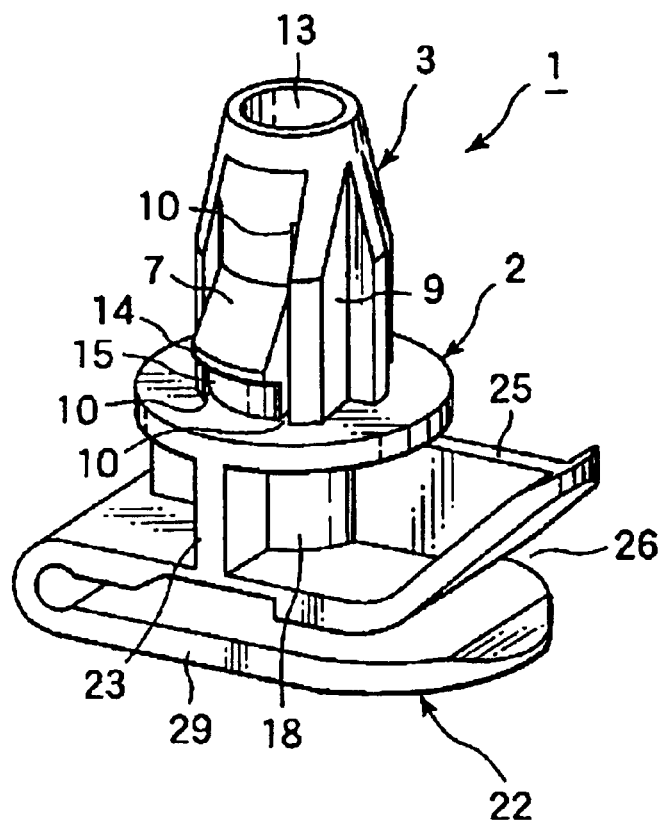
FIG. 1 is a perspective view of the screw grommet in a working example of the present invention.

The following is an explanation of working examples of the present invention with reference to the drawings. FIG. 1 through FIG. 11 show the screw grommet in a working example of the present invention. The screw grommet 1 is an integrated plastic fastening tool. The screw grommet 1 is equipped with a flange 2 and a shank 3 extending from the flange 2. The shank 3 is tube-shaped for insertion into an attachment hole 6 in a workpiece 5 (FIG. 10) such as a car body. A pair of anchor-shaped legs 7, 7 on the shank 3 extend from the end of the shank (the upper end of the shank 2 in FIG. 1) towards the flange 2. The end of the legs 7 towards the flange 2 is the free end. It extends outward radially from the shank 3 and is flexible so as to bend inward and outward radially. The ends of the legs 7 are connected to the main section 9 of the shank 3 and the other ends are separated from the main section 9 of the shank by a U-shaped groove 10 shown in FIG. 1 and FIG. 2. These, too, are flexible so as to bend inward and outward radially with respect to the main section 9 of the shank.

A through-hole 13 is formed in the center of the flange 2 and the shank 3 for inserting the tapping screw 11 (FIG. 10) and make the shank 3 hollow. The hollow section of the shank 3 is filled when the tapping screw 11 is screwed into the through-hole 13. This keeps the free ends of the legs 7 from bending inward radially. A locking shoulder 14 is formed on the outside section of the free ends of the legs 7 to engage the edge of the attachment hole in the workpiece. Screwing in the tapping screw 11 brings the locking shoulders 14 on the legs 7 in firm contact with the attachment hole 6 in the workpiece 5. The fixed legs 7 extending outward and the flange 2 secure the screw grommet 1 to the workpiece 5. The free ends of the legs 7 have a catching section 15 extending from the locking shoulder 14 towards the end. These come into contact with the surface of the workpiece and catch.

A threaded section 17 extending inward so the diameter of the screw through-hole 13 is smaller than the outer diameter of the tapping screw is formed on the free ends of the legs 7 (near the locking shoulder 14). Because the threaded section 17 has a diameter smaller than the outer diameter of the tapping screw, threading is formed in the inner wall when the tapping screw is screwed in. This strengthens the extension of the free ends of the legs 7 outward, strengthens the contact and connection between the edge of the attachment hole in the workpiece and the locking shoulder 14 and catching section 15 of the legs 7 on the inside wall. As a result, the screw grommet is secured more firmly to the workpiece.

A tube-shaped fastening torque bearing section 18 extending opposite the shank 7 (towards the bottom in FIG. 1 and FIG. 2) is integrated with the flange 2. A second through-hole 19 is formed in the fastening torque bearing section 18 with a diameter smaller than the outer diameter of the tapping screw and aligned axially with the through-hole 13 in the flange 2 and the shank 3 so as to be able to screw in the tapping screw. The fastening torque from the insertion of the tapping screw is born not by the threaded section 17 in the legs 7 but by the fastening torque bearing section 18. The fastening torque bearing section 18 is integrated with the flange 2 and secured to the flange 2. It is also integrated with the main section 9 of the shank and integrated with the main section 9 of the shank. The legs 7 are only partially integrated with the main section 9 of the shank because of the U-shaped groove 10. Therefore, they can move radially inward and outward and move circumferentially with respect to the main body 9 of the shank only by the amount of space created by the U-shaped groove 10.

A threaded section 17 is formed on the inside on the legs 7 so the fastening torque from the screw driver is applied to the legs 7 via the threaded section 17. This moves the legs 7 circumferentially by the amount of space created by the U-shaped groove 10, and the legs 7 are twisted. When the strong fastening torque from the tool is applied to the legs 7 via the threaded section 17, a strong moment is applied to the base of the legs (the end of the shank), the legs become twisted, and there is a possibility of damage. Because the latest fastening tools are strong and compact, the tapping screw is subject to strong torque and the legs are even more likely to be damaged. The fastening torque bearing section 18 connected to the flange 2 and the main section 9 of the shank keeps the strong fastening torque due to the screw driver from being concentrated in the legs 7. Therefore, the legs 7 are less likely to be damaged. Because a fastening tool with strong fastening torque can be used, components can be quickly attached using a screw grommet.

Figure 9:
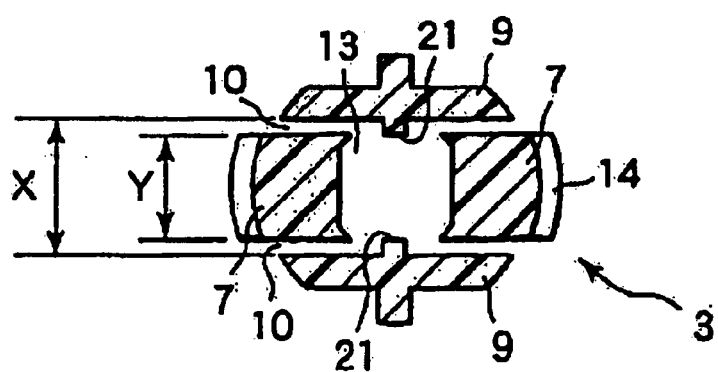
FIG. 9 is a cross-sectional view of the screw grommet in FIG. 3 along line C—C.

As shown in FIG. 9, ribs 21 extending towards the through-hole 13 are formed inside the main section 9 of the shank separated from the legs 7 by the U-shaped groove 10 (i.e., the main section of the shank near the threaded section 17 of the legs 7). The ribs 21 extend axially with respect to the shank 3. The ribs 21 extend towards the through-hole 13 and bear some of the fastening torque when the tapping screw is screwed in. The ribs 21 are formed in opposing pairs as shown in FIG. 9. The ribs 21 can also disperse the strong fastening torque applied to the legs by the screw driver.

As shown in FIG. 9, the circumferential width of the U-shaped groove 10 separating the legs 7 from the main section 9 of the shank is as small as possible. In FIG. 9, width X including two U-shaped grooves 10 and the circumferential width Y of the legs 7 is as close as possible to the width of the legs 7. The fastening torque twists the legs 7 circumferentially. If width X is close to width Y, however, contact with the side wall of the nearby main section 9 of the shank occurs and further twisting is prevented even when the legs 7 are twisted. Therefore, twisting of the legs due to the fastening torque from the tapping screw can be prevented if the circumferential width of the U-shaped groove is smaller.

Figure 2:
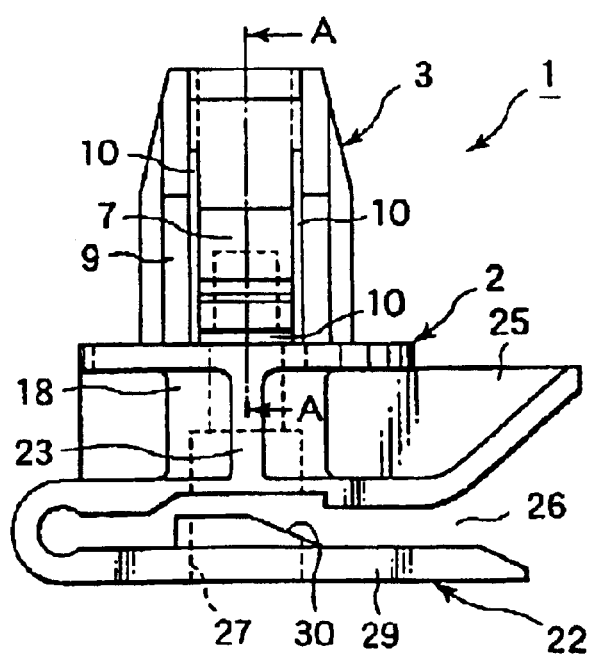
FIG. 2 is a frontal view of the screw grommet in FIG. 1.
Figure 3:
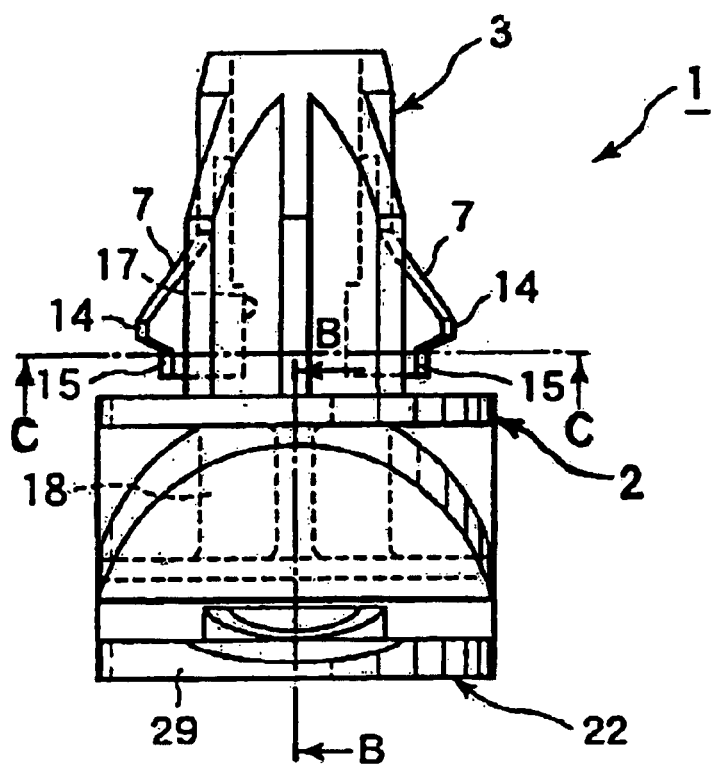
FIG. 3 is a right-side lateral view of the screw grommet in FIG. 1.
Figure 4:
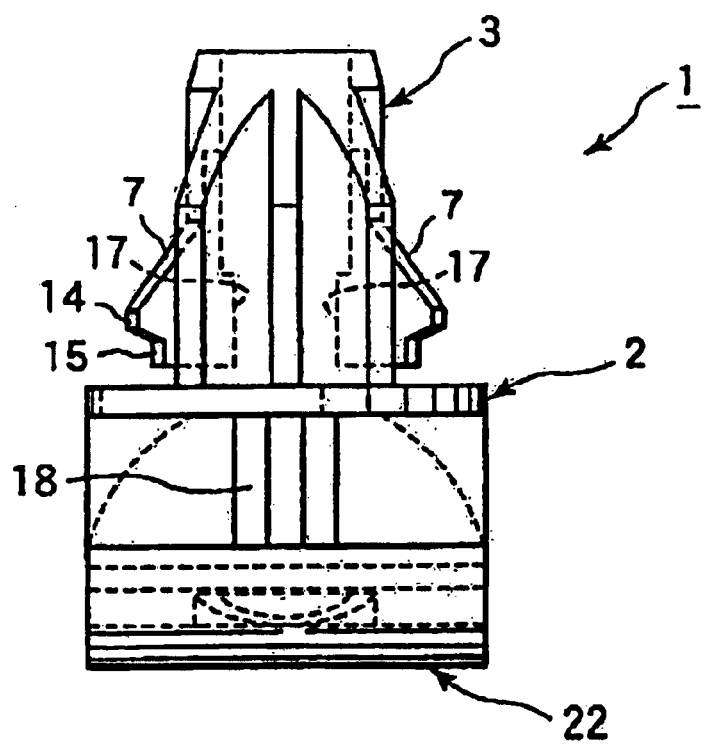
FIG. 4 is a left-side lateral view of the screw grommet in FIG. 1.
Figure 5:
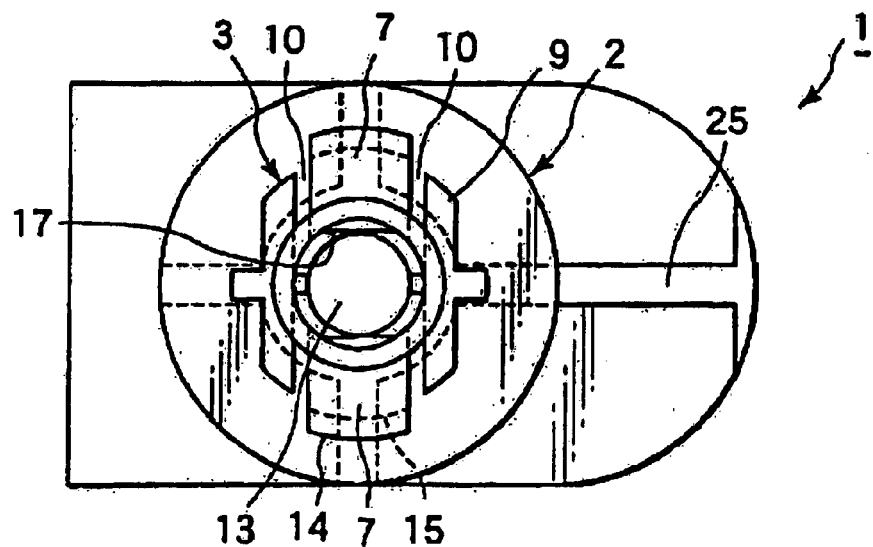
FIG. 5 is a planar view of the screw grommet in FIG. 1.
Figure 6:
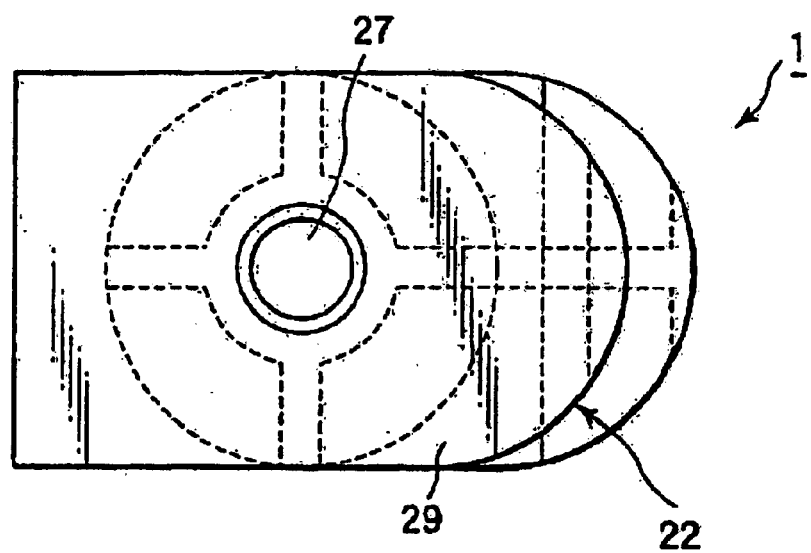
FIG. 6 is a bottom view of the screw grommet in FIG. 1.
Figure 7:
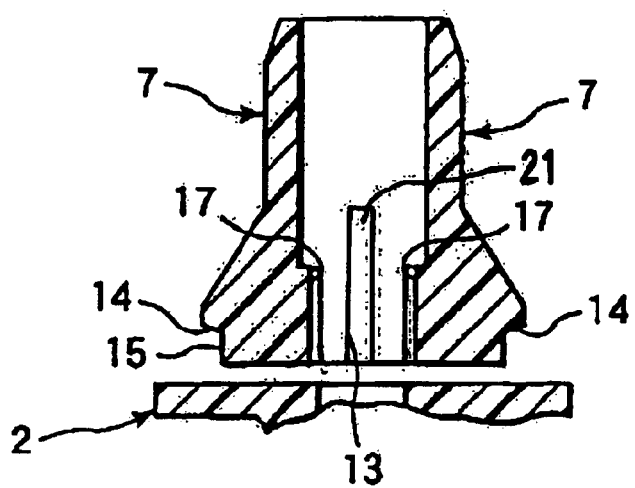
FIG. 7 is a partial cross-sectional view of the screw grommet in FIG. 2 along line A.
Figure 8:
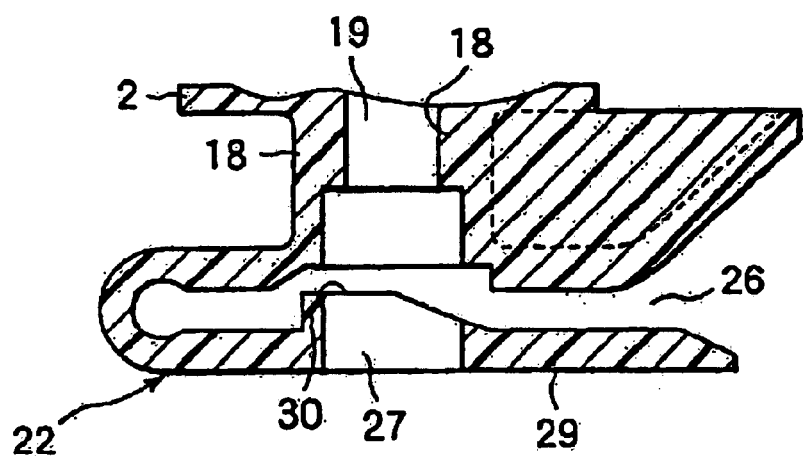
FIG. 8 is a partial cross-sectional view of the screw grommet in FIG. 3 along line B—B.

A holding clip section 22 bent in a U shape is integrated with the fastening torque bearing section 18 and arranged nearly parallel to the plane of the flange 2 at the end of the tube-shaped fastening torque bearing section 18 opposite the flange 2 (the bottom end in FIG. 1 and FIG. 2). As shown in FIG. 2, the U-shaped holding clip section 22 is secured firmly to the fastening torque bearing section 18 and the flange 2 by the ribs 23, 25. The holding clip section 22 provides the U-shaped section with some elasticity, and can be slipped on panel-shaped components or components on a panel to secure them. The opening section opens wide to make insertion into the U-shaped section easier. A third through-hole 27 aligned axially with the through-hole section 13 and the second through-hole section 19 to receive the tapping screw is formed in the clip section 22. The outside surface of the support plate 29 (the bottom surface in FIG. 2), which is able to bend the clip section 22 elastically, is flat so other components can be supported by the tapping screw. A locking section 30 is formed on the inside of the support plate 29 to temporarily catch inserted components so they do not fall off.

Figure 11:
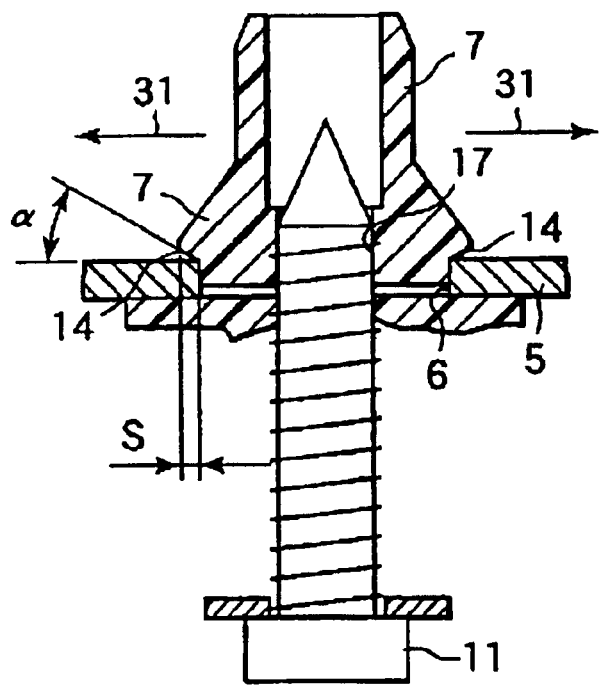
FIG. 11 is a cross-sectional view used to explain the action of the locking shoulders on the legs of the screw grommet in FIG. 1.

The locking shoulders 14 on the anchor-shaped legs, as shown in FIG. 11, are not parallel to the surface of the workpiece 6 on the locking side but rather inclined at a constant angle α. This allows workpieces of varying thicknesses to be secured firmly. In FIG. 11, as the tapping screw 11 is screwed into the threaded section 17 of the legs 7, the force applied in the direction of arrow 31 towards the legs 7 is deflected away from the legs 7, and the locking shoulder 17 comes into contact with the edge of the attachment hole 6 in the workpiece 5. Because the locking shoulder 14 is inclined at angle α, it engages the attachment hole 6 in the space S shown in FIG. 11 and is secured firmly to the workpiece based on its thickness.

Figure 10:
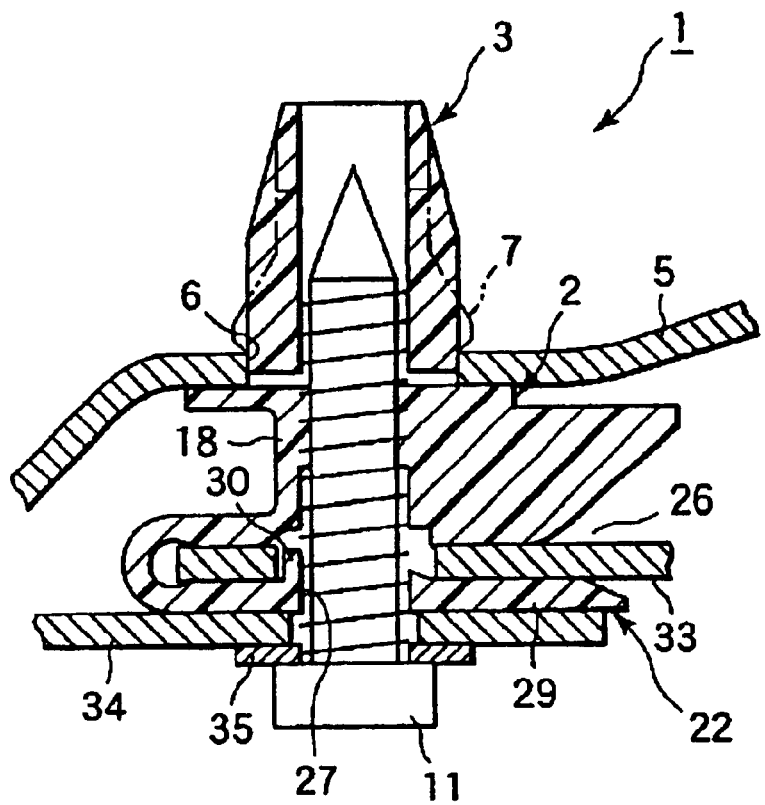
FIG. 10 is a cross-sectional view of two attached components connected to the workpiece using the screw grommet in FIG. 1.

The connection of a first attached component 33 and a second attached component 34 such as a pair of engine covers on a workpiece 5 such as a car body using the screw grommet 1 is shown in FIG. 10. The shank 3 on the screw grommet 1 is inserted into the attachment hole 6 in the workpiece 5 until the flange 2 comes into contact with the workpiece 5. The first attached component 33 is inserted from the opening section 26 of the holding clip section 22, and the locking section 30 engages the attachment hole. The second attached component 34 is arranged so the attachment hole is aligned with the third through-hole 27 in the support plate 29 of the holding clip section 22. The tapping screw 11 is then passed through a washer 35 and the third through-hole 27, and then screwed into the screw grommet 1 using an air-powered tool. When the tapping screw 11 is screwed into the threaded section 17, the free end of the legs 7 is extended strongly to the outside of the locking shoulder 14 and the catching section 15, and the screw grommet 1 is secured firmly to the workpiece 5. The tapping screw 11 is screwed into the fastening torque bearing section 18, and the fastening torque from the tapping screw is born by the fastening torque bearing section. This keeps the strong fastening torque from being concentrated in the legs and decreases the likelihood of the legs being damaged. The holding clip section 22 also connects the first attached component 33 to the second attached component 34. As a result, the separate components are connected.

Figure 12:
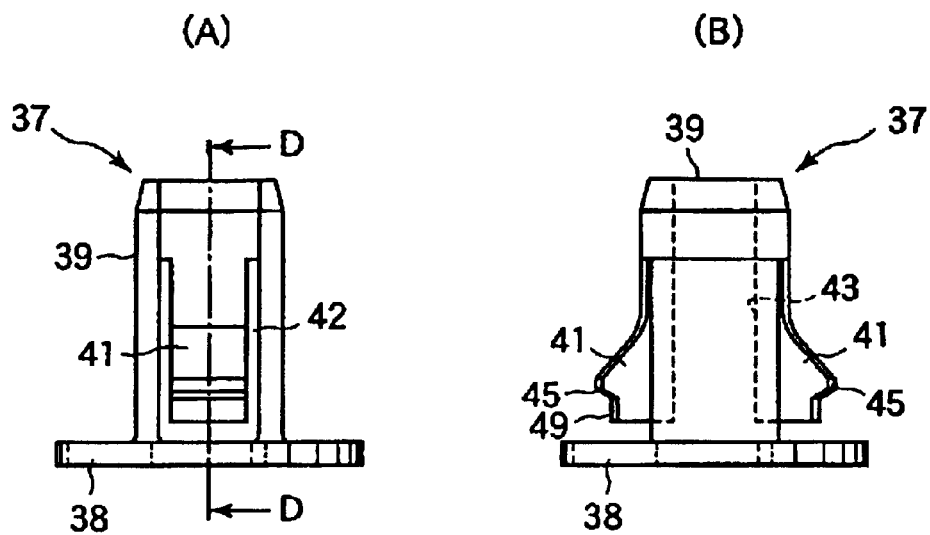
FIG. 12 is a view of another screw grommet. (A) is a right-side cross-sectional view, and (B) is a left-side cross-sectional view.
Figure 13:
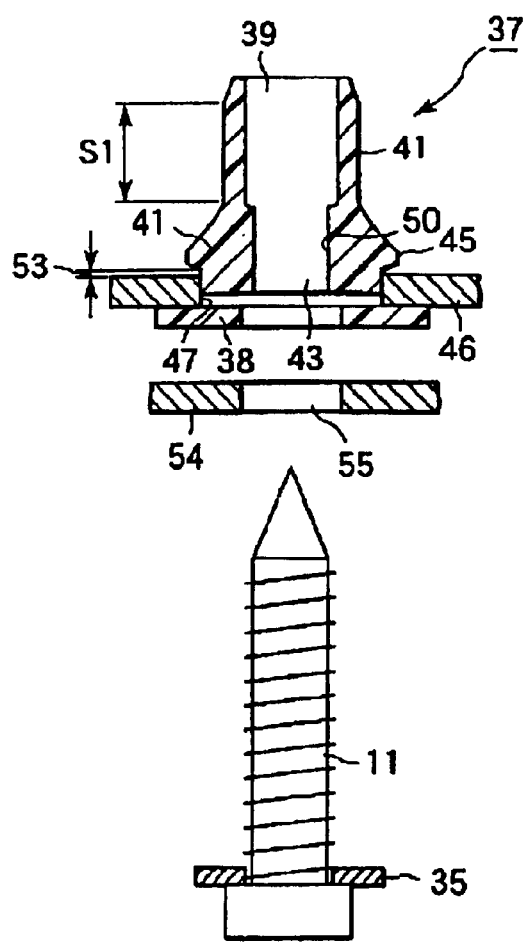
FIG. 13 is a cross-sectional view before connecting an attached component to a workpiece using the screw grommet in FIG. 12.
Figure 14:
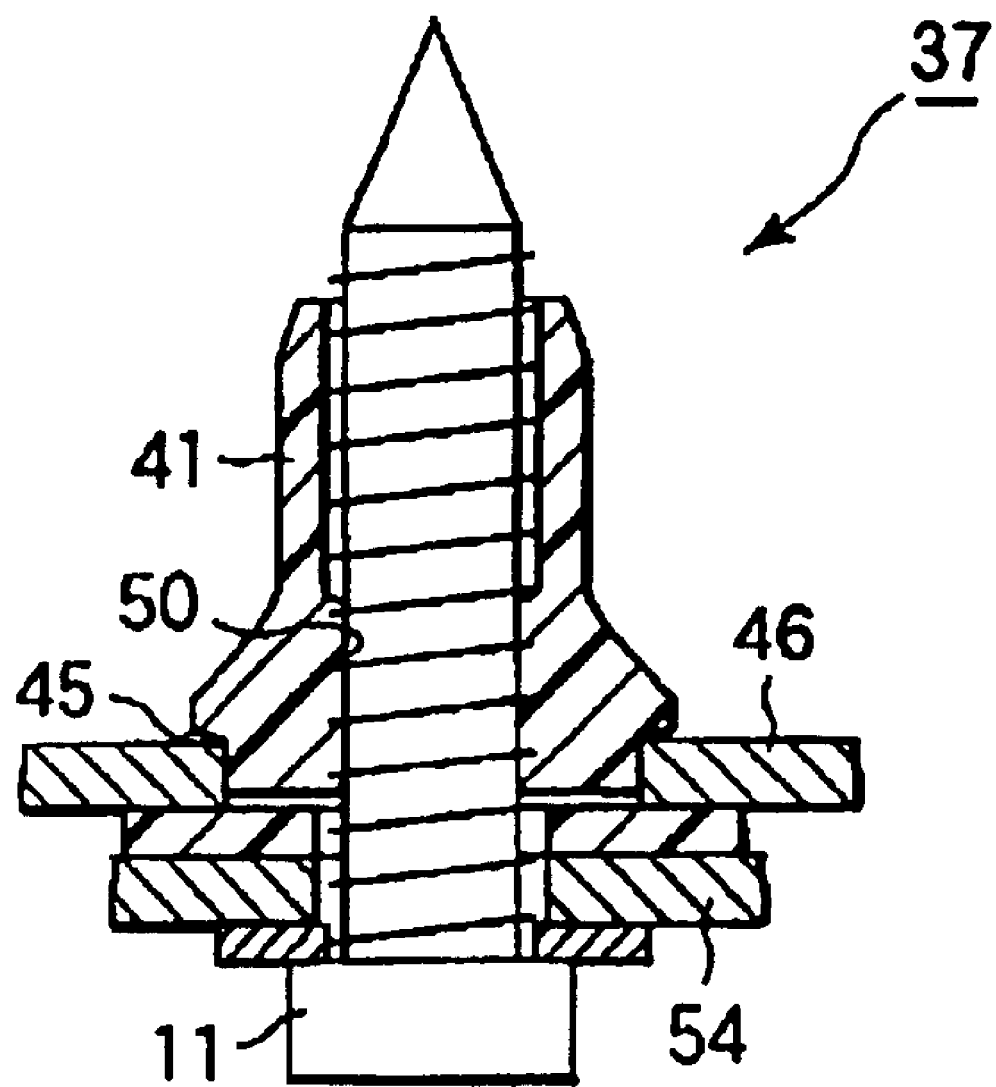
FIG. 14 is a cross-sectional view after connecting an attached component to a workpiece using the screw grommet in FIG. 12.

FIG. 12 through FIG. 14 show another screw grommet 37. The screw grommet 37 is an integrated plastic fastening tool equipped with a flange 38 and a shank 39 extending from the flange 38. The shank 39 is tube-shaped for insertion into an attachment hole 42 in a workpiece 46. A pair of anchor-shaped legs 41 on the shank 39 extend from the end of the shank (the upper end of the shank 39 in FIG. 12) towards the flange 38. The end of the legs towards the flange 38 is the free end. It extends outward radially from the shank 39 and is flexible so as to bend inward and outward radially. The ends of the legs 41 are connected to the main section of the shank 39 and the other ends (the upper end in FIG. 12) are separated from the main section of the shank 39 by a U-shaped groove 42 shown in FIG. 12 (A). These too are flexible so as to bend inward and outward radially with respect to the main section of the shank. A through-hole 43 is formed in the center of the flange 38 and the shank 39 for inserting the tapping screw 11 (FIG. 13) and make the shank 39 hollow. The hollow section of the shank 3 is filled when the tapping screw 11 is screwed into the through-hole 43. This keeps the free ends of the legs 41 from bending inward radially. A locking shoulder 45 is formed on the outside section of the free ends of the legs 41 to engage the edge of the attachment hole in the workpiece. Screwing in the tapping screw 11 brings the locking shoulders 45 on the legs 41 in firm contact with the attachment hole 47 in the workpiece 45. The fixed legs 41 extending outward and the flange 38 secure the screw grommet 37 to the workpiece 47. The free ends of the legs 41 have a catching section 49 extending from the locking shoulder 45 towards the end. These come into contact with the surface of the workpiece and catch.

A threaded section 50 extending inward so the diameter of the screw through-hole 43 is smaller than the outer diameter of the tapping screw is formed on the free ends of the legs 41 (near the locking shoulder 45). Because the threaded section 50 has a diameter smaller than the outer diameter of the tapping screw, threading is formed in the inner wall when the tapping screw is screwed in. This strengthens the extension of the free ends of the legs 41 outward, strengthens the contact and connection between the edge of the attachment hole in the workpiece and the locking shoulder 45 and catching section 49 of the legs 41 on the inside wall. As a result, the screw grommet is secured more firmly to the workpiece.

The locking shoulders 45 on the anchor-shaped legs are not parallel to the surface of the workpiece 47 on the locking side but rather inclined at a constant angle. This allows workpieces of varying thicknesses to be secured firmly. As the tapping screw 11 is screwed into the threaded section 50 of the legs 41, the force applied outside radially is deflected away from the legs 41, and the locking shoulder 45 comes into contact with the edge of the attachment hole 47 in the workpiece 46. Because the locking shoulder 45 is inclined at an angle, it is secured firmly to the workpiece based on its thickness.

As shown in FIG. 13, the sections 51 of the legs 41 other than the threaded section 50 are thin and extendable so as to draw the free end closer to the flange 38 when the tapping screw 11 is screwed in and fastened. As a result, the legs 41 are raised to the surface of the workpiece 46 and the grommet is secured more firmly. In FIG. 13, the thin sections 51 are extended by the screwing in of the tapping screw 11 only by an amount equal to the space 53 between the workpiece 46 and the locking shoulder 45. The space 53 is closed, the legs 41 are raised to the surface of the workpiece 46, and the grommet is secured more firmly.

The connection of an attached component 54 to a workpiece 46 such as a car body using the screw grommet 37 will now be explained. The configuration before the connection is shown in FIG. 13 and the configuration after the connection is shown in FIG. 14. The shank 39 on the screw grommet 37 is inserted into the attachment hole 47 in the workpiece 46 until the flange 38 comes into contact with the workpiece 46. The attached component 54 is arranged so it engages the through-hole 43 in the flange 38. The tapping screw 11 is then passed through a washer 35 and attachment hole 55 in the workpiece 54, and then screwed into the screw grommet 37 using an air-powered tool. When the tapping screw 11 is screwed into the threaded section 50, the free end of the legs 41 is extended strongly to the outside of the locking shoulder 45 and the catching section 49, and the screw grommet 37 is secured firmly to the workpiece 46. The attached component 54 is then secured firmly to the workpiece 46. In FIG. 13, the thin sections 51 are extended by the screwing in of the tapping screw 11 only by an amount equal to the space 53 between the workpiece 46 and the locking shoulder 45. The space 53 is closed, the legs 41 are raised to the surface of the workpiece 46, and the grommet is secured more firmly as shown in FIG. 14.

Because the screw grommet has a threaded section on the inside of the free ends of the legs with a diameter greater than the outer diameter of the tapping screw in the screw grommet of the present invention, the free ends of the legs expand outward strongly and the screw grommet is secured to the workpiece firmly. Because a threaded through-hole with a diameter smaller than the tapping screw is formed in the fastening torque bearing section, and the fastening torque from screwing in the tapping screw is born by the fastening torque bearing section outside the threaded section of the legs, strong fastening torque is not concentrated in the legs and the legs are less likely to be damaged. As a result, a fastening tool with high fastening torque can be used and the screw grommet can be used to quickly attach a component.

In another screw grommet of the present invention, a threaded section is formed on the inside section of the free end of the legs for receiving the tapping screw and extending towards the inside so the diameter of the threaded through-hole becomes smaller than the outer diameter of the tapping screw, and the sections of the legs other than the threaded section are thin and extendable so as to draw the free end closer to the flange when the tapping screw is screwed in and fastened. As a result, the legs are raised towards the surface of the workpiece and more firmly secured when the tapping screw is screwed in and fastened.

What is claimed is:

1. A screw grommet for securing workpieces with a threaded fastener, the screw grommet comprising:

a tubular body having a first end and a second end; and a flange radially extending from said body and positioned between said first and second ends, wherein said tubular body includes a shank section extending from said flange toward said first end and a torque bearing section extending from said flange toward said second end, said torque bearing section including a first threadable aperture having a size smaller than the outside diameter of the threaded fastener, said shank section including flexible legs having a free end positioned proximate to said flange, said shank section including a pair of substantially parallel, spaced apart, walls outwardly protruding from said tubular body, one of said flexible legs being moveable relative to and positioned between said walls, wherein said walls limit the amount said flexible leg may circumferentially twist during insertion of the threaded fastener, said shank section further including a second threadable aperture formed on an inner surface of said free end of said legs, said second threadable aperture having a size smaller than the outside diameter of the threaded fastener and being formed at least in part by opposed flat parallel walls.

2. The screw grommet of claim 1 wherein said torque bearing section includes an aperture being aligned with said first threadable aperture and having a size greater than the outside diameter of the threaded fastener.

3. The screw grommet of claim 2 wherein said shank section includes a first portion including said second threadable aperture and a second portion including an aperture having a size greater than the outside diameter of the threaded fastener.

4. The screw grommet of claim 3 wherein said shank section includes sidewalls adjacent said flexible legs, each of said sidewalls including an axially extending rib formed in said first portion, said ribs being spaced apart a distance less than the outer diameter of the threaded fastener.

5. The screw grommet of claim 1 further including a clip section extending from said flange, said clip section including a cantilevered flexible tang having an aperture extending therethrough, said aperture being aligned with said first threadable aperture.

6. The screw grommet of claim 5 wherein said clip section includes a locking tab extending from said flexible tang, said locking tab adapted to selectively engage the workpiece within an aperture extending therethrough.

7. The screw grommet of claim 6 wherein said extends through said locking tab.

8. The screw grommet of claim 1 wherein each of said flexible legs includes a radially extending protrusion positioned to biasedly engage the workpiece during installation.

* * * * *

UNITED STATES PATENT AND TRADEMARK OFFICE
CERTIFICATE OF CORRECTION

PATENT NO. : 6,805,524 B2
DATED : October 19, 2004
INVENTOR(S) : Hideki Kanie et al.

It is certified that error appears in the above-identified patent and that said Letters Patent is hereby corrected as shown below:

Column 8,
Line 58, after "said" insert -- aperture of said flexible tang --.

Signed and Sealed this

Fifteenth Day of February, 2005

JON W. DUDAS
*Director of the United States Patent and Trademark Office*